United States Patent Office 3,793,434
Patented Feb. 19, 1974

3,793,434
PROMOTER FOR GAS ABSORPTION
Frederic Leder, Elizabeth, N.J., assignor to Esso
Research and Engineering Company
No Drawing. Continuation-in-part of application Ser. No. 825,444, May 16, 1969, now Patent No. 3,637,345. This application Oct. 1, 1971, Ser. No. 185,841
The portion of the term of the patent subsequent to Jan. 25, 1989, has been disclaimed
Int. Cl. C01b 31/20
U.S. Cl. 423—223   24 Claims

ABSTRACT OF THE DISCLOSURE

When using potash or other alkali metal salts such as borates, carbonates, hydroxides, phosphates or bicarbonates in solution to remove acid gases such as $H_2S$ and $CO_2$, $SO_2$ and COS from gaseous mixtures, unexpectedly high absorption and desorption rates are obtained by adding to the solution piperidine and derivatives thereof and/or 1,6-hexanediamine or derivatives thereof under designated conditions. These amines are capable of forming regions of liquid-liquid-gas immiscibility in the process solution; the mixture is, however, maintained in a single phase during the absorption and desorption of the gases. The single phase is maintained by keeping the acid gas, e.g., $CO_2$ level in the solution above about 25% of the solutions total capacity for $CO_2$.

CROSS-REFERENCE TO RELATED APPLICATION

This application is a continuation-in-part of U.S. Ser. No. 825,444 filed May 16, 1969 now Pat. No. 3,637,345, entitled "Promoter for Gas Absorption," Inventor: Frederic Leder.

PRIOR ART

The use of a solution of potash or other alkali metal salts to absorb acid gases such as $CO_2$, $H_2S$, $SO_2$, $CO_2$ and COS is well known. In U.S. Pat. 2,718,454 the patentee makes use of potash and similar alkali metal salts in conjunction with amines such as monoethanolamine, diethanolamine and triethanolamine to remove acid gases from a gas mixture. The combination of the alkali metal compounds in conjunction with the designated amine yields higher capacity for acid gases than systems with the amine alone.

In British Pat. 1,063,517 to Allen G. Eickmeyer the problem of removing acid gases such as $CO_2$ and $H_2S$ was faced. Patentee, in the British reference, teaches the use of potassium carbonate and other alkali metal carbonates in conjunction with particular amines which will avoid corrosion problems and at the same time accelerate the absorption and subsequent desorption of the $CO_2$ and $H_2S$. Specifically, patentee makes use of ethylene polyamine, alkanolamines or alkanolamine borates as well as mixtures thereof. Examples of such amines are ethylenediamine, diethyltriamine and diethanolamine, etc.

In U.S. Pat. 3,144,301, there is disclosed the use of potassium carbonate in conjunction with diethanolamine and monoethanolamine to remove $CO_2$ from gas mixtures.

All of these techniques represent a method by means of which acid gas may be successfully removed; they have, however, shown a limited rate and capacity for acid gas removal, and as such do not present the most desirable technique for removal of acid gases.

SUMMARY OF THE INVENTION

According to this invention it has unexpectedly been discovered that the addition of designated amines, e.g., piperidine, 1,6-hexanediamine and their derivatives to solutions of alkali metal salts, in specified amounts, results in the formation of a solution with a much improved ability to remove acid gases from gas mixtures, relative to the existing technology. The solution is maintained in a single liquid phase during the removal of the acid gases by maintaining the acid gas, e.g., $CO_2$ level in the solution at or above about 25% of the solution's total capacity for acid gas, e.g., $CO_2$.

The amines utilized are capable of forming regions of liquid-liquid immiscibility when mixed under specified conditions in alkali metal salt solutions such as potash; for purposes of this invention, however, conditions are selected such that the liquid is in one phase throughout the course of absorption and desorption. In a particular embodiment of the instant invention, conditions are maintained such that separation of the solution into two liquid phases is incipient, during at least part of the absorption-desorption cycle. By incipient it is meant phase separation is about to commence but has, in fact, not occurred so that only one liquid phase exists. The incipient phase separation is characterized by enhanced surface activity of the amine and mechanical instability of the surface of the liquid. The said incipient phase separation may be assessed by measuring changes in surface tension and surface concentration of amine, relative to their value, at the same temperature and pressure far removed from the two phase region.

The contacting of the absorbent mixture and the acid gas may take place in any suitable contacting tower. The term acid gas includes $SO_2$, $CO_2$, COS and $H_2S$ and oxides and sulfur derivatives of $C_1$ through $C_4$ hydrocarbons. These acid gases may be present in trace amounts within a gaseous mixture or in major proportions.

The absorbing solution will comprise a major proportion of alkali metal salts and a minor proportion of the amine. The specific amines to be utilized, piperidine and its derivatives and 1,6-hexanediamine and its derivatives are contacted wth the acid gases at temperatures of 25 to 200° C. and pressures of 5 to 2000 p.s.i.g. The salt content of the solution will vary between 5 and 40 wt. percent, and amine concentrations may vary between 2 and 20 wt. percent, these should be at least 2 wt. percent of amine present, the remainder of the solution is water.

The absorbent mixture, after absorbing the acid gas is then subjected to regeneration. Stripping of the acid gas, or regeneration, may be accomplished conventionally by blowing with steam or inert gas according to techniques well known in the art. Stripping is facilitated, however, when utilizing these conventional techniques, because of the use of the designated amines of the instant invention.

More specifically, the instant invention pertains to a method for removal of acid gases from gaseous mixtures in which they are carried. By acid gases it is meant $CO_2$, $H_2S$, $SO_2$, COS and oxides and sulfur derivatives of methane, ethane, propane and butane. Such acid gases in the fluid or gaseous state are found in mixtures of natural gas, hydrogen and synthetic gas made from coal or oil. The removal of these acid gases is essential since some of them are inherently corrosive and tend to precipitate during processing, others are pollutants, or undesired diluents and some are catalyst poisons. To remove these acid gases from the mixture; the mixture while in the fluid, preferably the gaseous state, is brought into contact with the liquid absorbent solution which will preferentially absorb the acid gases and at the same time substantially exclude other elements of the mixture.

The contacting takes place under conditions such that the acid gas, e.g., $CO_2$ is absorbed by the solution. During absorption the solution is maintained in a single liquid phase.

It has been known in the past to use alkali metal carbonates, bicarbonates, hydroxides, borates and phosphates for the absorption of the acidic gases from a fluid or gaseous mixture, these salts may be used in the instant invention. Typical salts which may be utilized in this invention include sodium hydroxide, sodium carbonate, lithium hydroxide, lithium carbonate, potassium hydroxide, potassium bicarbonate and potassium carbonate and cesium carbonate.

The preferred alkali metal salts for use in the instant invention are potassium carbonate and sodium carbonate. The alkali metal salts, e.g., carbonates, may be present in an amount of about 5 to 40 wt. percent of the solution, the upper limit being determined by the concentration at which salt precipitation occurs under the conditions of operation. It shoulyd be noted that the solution is preferably aqueous. A preferred amount of alkali metal salt would be from about 15 to 40 wt. percent and the most preferred range would be from about 25 to 35 wt. percent.

The absorptive ability of the alkali metal compound is greatly increased by adding the amines of the instant invention, which amines have the capacity to form under specified conditions, an immiscible region within the alkali metal solution. In the instant invention, however, it should be emphasized that the solution is maintained in a single liquid phase during absorption.

The amines which are to be utilized in the instant invention are piperidine and its derivatives of piperidine are as follows:

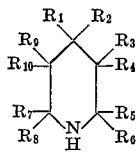

wherein $R_1$ to $R_{10}$ are independently selected from the group consisting of hydrogen, $C_1$ to $C_3$ alcohols, $C_1$ to $C_3$ alkyl groups, $C_2$ to $C_3$ alkenyl groups, amino groups, carboxyl groups, hydroxyl groups, sulfides, hydrosulfides, and phosphate groups. $R_1$ to $R_{10}$ may also be $C_6$–$C_{12}$ aryl or substituted aryl groups, e.g., amino, carboxyl, hydroxyl, etc., provided the compounds remain at least partially miscible with water. It is preferred that $C_1$ to $C_3$ alkyl, hydrogen or $C_2$ to $C_3$ alkenyl groups are utilized for $R_1$ to $R_{10}$. The most preferred compounds would utilize hydrogen for the various R's; thus, piperidine itself is a most preferred compound for use in the instant invention.

The other preferred group of amines is 1,6-hexanediamine and derivatives thereof. The derivatives of 1,6-hexanediamine are as follows:

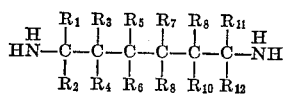

wherein $R_1$ to $R_{12}$ are independently selected from tne group consisting of hydrogen, $C_1$ to $C_3$ alcohols, $C_1$ to $C_3$ alkyl groups, $C_2$ to $C_3$ alkenyl groups, amino groups, carboxyl groups, hydroxyl groups, sulfides, hydrosulfides and phosphate groups. $C_6$ to $C_{12}$ aryl or substituted aryl groups, e.g., amino, carboxyl, hydroxyl, etc., provided the compounds remain at least partially miscible with water. It is preferred to select $R_1$ through $R_{12}$ from the groups consisting of hydrogen, $C_1$ to $C_3$ alcohols, $C_1$ to $C_3$ alkyl groups, and $C_2$ or $C_3$ alkenyl groups. The most preferred compounds are those in which $R_1$ through $R_{12}$ are hydrogen; thus, 1,6-hexanediamine is a most preferred compound for the instant invention.

In a broader embodiment of this invention any amines may be used which form regions of liquid-liquid immiscibility when mixed with alkali metal salt solutions at no or low (e.g., up to 25% of the ultimate solution capacity for the acid gas at the temperature and partial pressure utilized) acid gas loadings under normal pressure and temperature conditions utilized in absorption, e.g., 25–200° C. and 5–2000 p.s.i.g. Amines in addition to those listed above which are preferred are amines exhibiting liquid-liquid immiscibility as above-defined selected from the following: pyrrolidone, phenylene diamine, 7 amino-heptanoic acid, 9 amino nonanoic acid, 9 amino pelargonic acid; n-dodecyl trialkyl-methyl amine and n-lauryl-trialkyl methylamine, and derivatives of these two utilizing hydroxyl, amino, carboxylic groups to enhance their water solubility; toluene diamine, xylylene diamine, methylene dianiline, aniline, dipiperidine, 1-phenyl piperidine, 2 (2-hydroxy-ethyl) piperidine, cyclohexyl amine, diamino pentane, triamino pentane; 1,4 diamino benzene, 2-2 diamino biphenyl.

In general suitable amines are those which consist of at least one primary or secondary amino group, a hydrocarbon backbone, either cyclic, straight chain, or branched chain, and suitable substituent groups on the hydrocarbon backbone to afford a limited range of solubility with water. Such substituents might be hydroxyl, alcohol, carboxylic, nitrate, sulfate, sulfite, nitrite, phosphate, hydrosulfide, or amino groups.

The amine concentration should be at least 2% by wt. i.e., between 2 and 20 wt. percent, preferably 5 to 12 wt. percent, and most preferably 5 to 10 wt. percent. The higher amine concentration requires higher absorption of acid gas, e.g., $CO_2$ before the formation of one phase.

The contacting between the acid gas containing fluid mixture and the absorptive aqueous solution may be cocurrent or countercurrent; countercurrent is preferred. The contacting takes place between the gas mixture and the solution which is in a single liquid phase, i.e., without regions of liquid-liquid phase immiscibility. Temperature during the contacting may vary between 25 and 200° C., preferably 30 to 175° C., and most preferably 35 to 150° C. Pressures may vary widely, acceptable pressures are between 5 and 2000 p.s.i.g., preferably 100 and 500 p.s.i.g., and most preferably 200 to 400 p.s.i.g., in the absorber and 5–50 p.s.i.g. in the desorber. Generally the countercurrent contacting to remove the acid gas will last for a period of from 0.1 to 60 minutes, preferably 1 to 5 minutes. Contacting may take place when the acid gas containing mixture is either in the liquid or gaseous state but the gaseous state is much preferred.

To maintain a single liquid phase at the conditions specified herein for absorption, the acid gas, e.g., $CO_2$, level in the solution should be a minimum of 15%, preferably 25% of the solution's total capacity for acid gas, e.g., $CO_2$.

The contacting zone may be a packed tower, sieve trays or any conventional gas scrubber. A standard steel contacting tower is particularly effective. The tower may be equipped with bubble trays, Raschig rings or any other well known packing material to facilitate contacting. The gas stream which is recovered which may be $H_2$ or $CH_4$ with substantially all of the acid gases removed may be used for many purposes, such as ammonia synthesis, hydrotreating or liquefied natural gas production, or synthetic fuel gas production.

Absorbing solution, which is saturated or partially saturated with acid gases such as $CO_2$ and $H_2S$ must then be regenerated so that it may be recycled back to the absorber. Typically, the solution is 50 to 90%, saturated preferably 65 to 75% saturated when it is regenerated. The regeneration must also take place in a single liquid phase, desorption is accomplished by traditional means. Steam is passed through the liquid solution until the acid gases are at least partially stripped from it. The absorbing solution after being cleansed of at least a portion of the acid bodies, may be recycled back to the absorbing tower. Make-up absorbent may be added as needed. Alternative methods of regenerating the spent absorbent includes air or $N_2$ stripping. Single phase is maintained during desorption by controlling the acid gas, e.g., $CO_2$ level so that it does not fall into the region where two liquid phases form.

In more detail, during desorption, the acid gas, e.g., $CO_2$, rich solution from the high pressure absorber is sent first to a flash chamber where steam and some $CO_2$ are flashed from solution at low pressure. The amount of $CO_2$ flashed off will in general be about 35-40% of the net $CO_2$ recovered in the flash and stripper. This is increased somewhat, e.g., to 40-50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 1-100 p.s.i.g., preferably 2-10, as compared with 200-1,000 p.s.i.g. typically in the absorber, temperature is between 100-175° C., preferably 120-160° C. Stripper and flash temperatures will, of course, depend on stripper pressure, thus at about 2-10 p.s.i.g. stripper pressures, the temperature will be about 100-160° C. during desorption. Single phase is maintained during desorption by regulating the amount of acid gas, e.g., $CO_2$ removed. If a minimum of about 15% of the total $CO_2$ capacity preferably about 25% of the total $CO_2$ capacity remains in the solution, the solution will remain as a single liquid phase. To operate in the incipient region the scrubbing solution should be desorbed to within 20%, preferably within 15% of the level of saturation wherein two phases will form.

In a preferred system of operation two towers coupled together are used. In tower A, the absorption or scrubbing tower, the gas mixture to be treated passes cocurrently or countercurrently to the solution in which the gas is to be absorbed, the absorbing or scrubbing solution. The scrubbing solution which is usually introduced into the top of the tower comprises about 25-35 wt. percent alkali metal salt, e.g., potassium or sodium carbonate, about 5-10 wt. percent amine, e.g., 1,6-hexane-diamine and the remainder is substantially all water. The gas mixture is introduced into the bottom of the tower, comprising hydrogen and acid gas, e.g., $CO_2$. It is preferably contacted countercurrently in tower A with the solution at a temperature of about 35-150° C., and a pressure of 200-400 p.s.i.g. for a period of at least 1-5 minutes. During absorption the solution is maintained in a single liquid phase. So long as the $CO_2$ content of the absorbing solution remains above about 15, preferably 25% of the total capacity of the solution for $CO_2$, the solution will remain in a single liquid phase. After the solution absorbs at least a portion of the acid gas and is about 50-85% saturated, it is preferred to regenerate the solution so that it may be recycled back into the top of tower A, the absorber.

The regeneration, which also takes place in a single liquid phase, is accomplished by flashing and subsequently passing steam through the liquid until the acid gases are stripped-out. During regeneration, the acid gas, e.g., $CO_2$, rich solution from the high pressure absorber tower A is sent first through a flash chamber where steam and some $CO_2$ are flashed from the solution at low pressure, e.g., 2-10 p.s.i.g. The amount of $CO_2$ flashed-off will in general, be about 25-40% by weight of the net $CO_2$ recovered in the flash and stripper. Solution from the flash chamber is then steam stripped in the regenerator tower B. The tower consists of a contacting zone and a reboiler. Generally, steam generated in the reboiler, passes upwardly through the liquid to be regenerated, stripping the acid gas away. Pressure in the tower B is between about 2 and 10 p.s.i.g., temperature is between about 120 and 160° C. Steam stripping rates between 0.5 and 2 lbs. of steam/lb. of $CO_2$ are utilized.

The liquid emerges from the regenerator tower B relatively lean in regard to its acid gas content, and contains acid gas in the amount of about 15-25% of its entire capacity for the acid gas, e.g., $CO_2$. The lean solution is then pumped to the top of tower A to again countercurrently contact the gas mixture entering the bottom of tower A.

It is preferred to desorb the lean solution within a designated margin of the acid gas content which would be required to form the two phase region. By doing this, one is able to operate within the previously defined region of incipient immiscibilty. This margin should be within 20% preferably within 15% of the acid capacity wherein two phases are formed; thus, if the two phase region occurs at 15% saturation with acid gas, the lean solution should be desorbed at least to the 35% saturation level and preferably to the 30% level. It is preferred to operate at least 5% from the point where two liquid phases are formed and preferably 10%. This degree of desorption brings the solution into the incipient immiscibility region, thereby generating unusually high mass transfer rates. The enhancement in rate of mass transfer provided by operating in the region of incipient immiscibility is particularly advantageous at the top of the absorber and the bottom of the stripper wherein the driving forces for mass transfer are minimal since the liquid is leanest in acid gas, e.g., $CO_2$ concentration is lowest. In fact, operating in the region of incipient immiscibility, in the lean solutions indicated above, provides a several fold advantage over rates discussed in the prior art.

Conducting absorption and desorption in a single phase offers advantages over operating in two phases: (1) it is much easier to desorb or steam strip the rich solution when it is in a single phase, this results in a considerable steam saving and a lower energy requirement for the system; and (2) the engineering aspects of handling a single phase solution are simpler than operating with a two phase system.

EXAMPLE 1

Rates of absorption and desorption of $CO_2$ in potassium carbonate/bicarbonate buffers were measured in a glass vessel containing 600 cc. of solution. To the buffer solution minor amounts of amine or amine plus boric acid were added. The buffer strength was two moles per liter. The vessel was agitated by means of a stirrer beneath the liquid surface. Pure $CO_2$ at 780 mm. absolute pressure was introduced through a gas sparger beneath the liquid surface. The vessel was jacketed and maintained at 80±.1° C. Absorption was determined by measuring the difference between the flow of $CO_2$ into the vessel and out of it. Flow-out was measured by a capillary constriction flow meter.

Desorption measurements were carried out in the same vessel. Nitrogen at 150° C. was sparged into the liquid at a flow rate of 2 moles per hour. The flow rate was sufficiently high to insure no gas phase resistance to desorption. $CO_2$ in the effluent nitrogen was measured chromatographically. Desorption was measured at 80° C. and 100° C.

Data pertaining to absorption and desorption rates of $CO_2$ in buffers, as described above, with 1,6-hexanediamine (HMDA) and diethanolamine (DEA) plus boric acid (equimolar) respectively, at the 10% additive level by weight, as observed in the single liquid phase region are shown in Table I. Rates of HMDA solution relative to those of DEA/boric acid, i.e., data are normalized to DEA/boric acid buffer absorption rates.

TABLE I

| | R (absorption) | R (desorption) |
|---|---|---|
| HMDA | 5 | 2.5 |
| DEA/boric acid | 1 | 1 |

Table I indicates HMDA, in buffers as described above, to be five (5) times more effective in promoting absorption and 2.5 times more effective in promoting desorption.

It should be noted that during the initial stages of absorption the HMDA containing solution was two phase.

The solution became one phase after small amounts of $CO_2$ were absorbed, i.e., when about 25% of the total capacity for $CO_2$ has been absorbed. Rate data recorded above pertains to single phase operations.

EXAMPLE 2

In this example the exact conditions of Example 1 are utilized except that

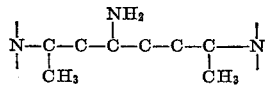

is substituted for 1,6-hexanediamine. Results substantially identical to those achieved in Example 1 with hexanediamine are observed for this amine.

EXAMPLE 3

In this example the exact conditions of Example 1 are utilized except that

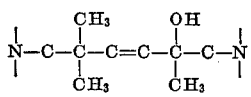

is substituted for hexanediamine. Results substantially identical to those achieved with hexanediamine are observed for this amine.

EXAMPLE 4

Carbon dioxide at 780 mm. total pressure was absorbed in a stirred vessel, containing potassium carbonate-bicarbonate buffer solutions. The strength of the buffer was 1 mole/liter $K_2CO_3$ and 1 mole/liter $KHCO_3$. To this solution piperidine and diethanol amine and boric acid were added to compare their absorptive ability. Absorption rates were measured as the difference between the gas flow in and the gas flow out of the vessel, measured by capillary constriction flow meter.

The vessel was stirred by a 6 blade turbine, approximately two inches below the surface, at 150 r.p.m. The vessel was stainless steel, nine inches inside diameter with half inch vertical baffles, and interfacial area of 410 cm.[2]. Temperature control was maintained at 80±.1° C., by a proportional controller. The volume of the vessel was set at 3800 cc. All chemicals used were of technical grade. Carbon dioxide was saturated with water vapor before entering the mixing cell, and introduced above the liquid surface.

Data pertaining to the absorption of $CO_2$ in piperidine containing solutions in the single phase region, and in diethanolamine (DEA) and boric acid (equimolar) solutions are tabulated in Table II. Relative rates of absorption in piperidine solution to DEA-boric acid buffers are shown at two levels of addition.

TABLE II

|  | R (5 wt. percent) | R (10 wt. percent) |
|---|---|---|
| Piperdine | 2.1 | 2.6 |
| DEA/boric acid | 1 | 1 |

Piperidine is seen to absorb at 2–3 times the rate of DEA/boric acid in potassium carbonate/bicarbonate solutions as described above. During the course of all of these runs the liquid solutions were one phase.

EXAMPLE 5

In this example the exact conditions of Example 4 are utilized again except that in place of the piperidine described in Example 4

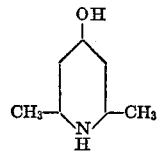

is utilized. Again results substantially identical to those achieved with piperidine in Example 4 are observed for this amine.

EXAMPLE 6

In this example the exact conditions of Example 4 are utilized again except that

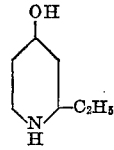

is substituted for the piperidine described in Example 1. Again results substantially identical to those achieved in Example 4 with piperidine are observed for this amine.

EXAMPLE 7

To illustrate the improved steam economy with the high absorption and desorption rates, two solutions were compared in a pilot plant comprising absorber, flash and stripper regenerator with continuous solution recirculation from the stripper base to the top of the absorber. The absorber was built from 2 inch, schedule 160 carbon steel pipe, and packed to a height of five feet with ¼ inch Raschig rings. The stripper was made from 3 inch, schedule 80 steel, and packed to a height of 8 feet with ½ inch Intalox saddles. The flash drum was 8 inches diameter by 4 feet high. Absorption took place at 250 p.s.i.g. and 220° F. The feed gas was a $N_2$ stream containing 20% $CO_2$. Flashing and stripping desorption were carried out at 210–250° F. and 20–25 p.s.i.g. with stripping stream generated by boiling solution in the base of the stripper. In all cases the solution, as prepared, contained 25 wt. percent $K_2CO_3$ and the solution circulation rate was 19.2 gallons/hr. The amount and composition of promoter used with each solution is given in Table III, below.

The solution working capacity for $CO_2$, defined as the mols of $CO_2$ removed from the gas stream per hour per mol of $K_2CO_3$ in the prepared solution circulated per hour through the absorber, was measured by two independent methods. These methods checked closely. The first involved measuring the amount of $CO_2$ scrubbed from the feed gas. This was done by measuring the total gas flow in and out on a wet test meter, and measuring the percent $CO_2$ in and out on a gas chromatograph. The difference, $CO_2$ in minus $CO_2$ out, represented the $CO_2$ picked up by the scrubbing solution. As a check on this procedure, samples of the $CO_2$ rich and lean solutions were withdrawn and analyzed for $CO_2$ content by a method that involved acidifying a known weight of solution and weighing the $CO_2$ involved. Steam consumption was measured by collecting and weighing steam condensed in the stripper reboiler coil, due allowance being made for heat losses from the equipment.

The comparative date for $CO_2$ working capacity, show a greatly increased capacity for $CO_2$ in the HMDA promoted solution, at either steam rate, resulting in a steam saving with HMDA at a given working capacity and representing a significant advantage over the prior art.

TABLE III

|  | $CO_2$ working capacity | |
|---|---|---|
| Promoter system | 1 lb. steam/lb. $CO_2$ | 1.5 lb. steam/lb. CO |
| 10 wt. percent 1,6-hexanediamine | 0.28 | 0.50 |
| 10 wt. percent diethanolamine-boric acid in 1:1 molar ratio | 0.18 | 0.21 |

During the course of these experiments steam rates as high as 2 lbs. steam/lb. $CO_2$ were used. Even under these extravagantly high steam rates the lean solution was not desorbed sufficiently to produce two liquid phases, i.e., liquid-liquid immiscibility. The lean solution loading was .55 moles $CO_2$/mole $K_2CO_3$ and the phase boundary was at .35 moles $CO_2$/mole $K_2CO_3$, i.e., the lean loading was 45% of the ultimate capacity for $CO_2$ in a feed of 50 p.s.i.g. $CO_2$, and the boundary was at 30%, thus the lean solution was within 15% of the phase boundary. Higher steam rates were considered impractical thus representing an inherent debit to the two phase process with regard to desorption, i.e., single phase operating is advantageous over the two phase operation in that there is a lower overall steam requirement.

What is claimed is:

1. A process for removing acid gases from a gaseous mixture, said acid gases selected from the group consisting of $CO_2$, $H_2S$, COS, $SO_2$, and oxidation products and sulfides of methane, ethane, propane and butane which comprises contacting said mixture with a solution, said solution comprising 5 to 40 wt. percent of an alkali metal salt, said salt selected from the group consisting of alkali metal bicarbonates, carbonates, hydroxides, borates and phosphates and at least about 2 wt. percent of an amine, said amine being selected from the group consisting of piperidine, derivatives of piperidine, 1,6-hexanediamine and derivatives of 1,6-hexanediamine at a temperature of 25 to 200° C., and a pressure of 5 to 2000 p.s.i.g. and maintaining said solution at an acid gas level of at least 15% of saturation, whereby said solution is present as a single phase during said contacting.

2. The process of claim 1 wherein the derivatives of piperidine have the following formula:

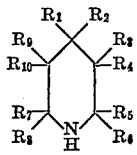

where $R_1-R_{10}$ may be selected independently from the group consisting of hydrogen, $C_{1-3}$ alkyl groups and $C_2-C_3$ alkenyl groups and the derivatives of 1,6-hexanediamine have the following formula:

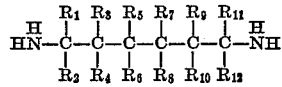

where $R_1-R_{10}$ may be selected independently from the group consisting of hydrogen, $C_1-C_3$ alkyl groups and $C_2-C_3$ alkenyl groups.

3. The process of claim 1 wherein said acid gas is $CO_2$.
4. The process of claim 1 wherein said acid gas is $H_2S$.
5. The process of claim 3 wherein said amine is piperidine.
6. The process of claim 3 wherein said amine is 1,6-hexanediamine.
7. The process of claim 6 wherein said amine is present in the amount of about 2 to 20 wt. percent.
8. The process of claim 6 wherein said alkali metal salt is an alkali metal carbonate present in the amount of about 5 to 40 wt. percent.
9. The process of claim 6 wherein said alkali metal salt is potassium carbonate.
10. The process of claim 6 wherein said mixture is natural gas.
11. The process of claim 8 wherein said mixture is synthetic natural gas.
12. The process of claim 8 wherein said acid gas level of said solution is maintained at from about 15 to 45% of saturation.
13. The process of claim 8 wherein said mixture is substantially $CO_2$ and hydrogen for the manufacture of $NH_3$, or treatment of refinery hydrocarbon streams.

14. A composition for scrubbing acid gases which comprises 5 to 40 wt. percent of an alkali metal salt selected from the group consisting of alkali metal bicarbonates, carbonates, hydroxides, borates and phosphates, at least 2 wt. percent of an amine selected from the group consisting of 1,6-hexanediamine, derivatives of 1,6-hexanediamine, piperidine and derivatives of piperidine, the balance of the composition being water.

15. The composition of claim 14 wherein said amine is 1,6-hexanediamine.
16. The composition of claim 14 wherein said salt is $K_2CO_3$.

17. A process for removing acid gases from a gaseous mixture, said acid gases selected from the group consisting of $CO_2$, $H_2S$, COS, $SO_2$ and oxidation products and sulfides of methane, ethane, propane and butane which comprises contacting in an absorption zone said gaseous mixture with a solution, said solution comprising 5 to 40 wt. percent of an alkali metal salt, said salt selected from the group consisting of alkali metal bicarbonates, carbonates, hydroxides, borates and phosphates, and at least about 2 wt. percent of an amine, said amine being selected from the group consisting of piperidine, derivatives of piperidine, 1,6-hexanediamine and derivatives of 1,6-hexanediamine at a temperature of from 35 to 150° C. and a pressure of from 100 to 500 p.s.i.g. for a period of from .1 to 60 minutes whereby said solution is saturated with acid gases to from 50 to 85% of capacity of said solution for absorbing said acid gases, passing said solution to a flash chamber, said flash chamber being maintained at a pressure of from 2 to 10 p.s.i.g. thereby flashing off at least some of said absorbed acid gas, passing said solution into a regenerator tower whereby said solution is maintained at a temperature of from about 120 to 160° C. and a pressure of from about 2 to 10 p.s.i.g. whereby the acid gas content of said solution is reduced to from about 15 to 25% of its capacity, passing said regenerated solution back to said absorption zone for reuse.

18. The process of claim 17 wherein said amine is selected from the group consisting of 1,6-hexanediamine and piperidine.
19. The process of claim 18 wherein said acid gas is $CO_2$.
20. The process of claim 19 wherein said amine is present in the amount of about 2 to 20 wt. percent.
21. The process of claim 20 wherein said alkali metal salt is an alkali metal carbonate present in the amount of about 5 to 40 wt. percent.
22. The process of claim 21 wherein said alkali metal salt is potassium carbonate.
23. The process of claim 22 wherein said amine is 1,6-hexanediamine.
24. The process of claim 22 wherein said amine is piperidine.

References Cited

UNITED STATES PATENTS

| | | | |
|---|---|---|---|
| 1,882,289 | 10/1932 | Lush | 423—243 |
| 1,951,992 | 3/1934 | Perkins | 423—228 |
| 2,161,663 | 6/1939 | Baehr et al. | 423—228 |
| 2,718,454 | 9/1955 | Wylie | 423—228 |

EARL C. THOMAS, Primary Examiner

S. B. SHEAR, Assistant Examiner

U.S. Cl. X.R.

423—228, 232, 234, 243